(12) United States Patent
Giberti et al.

(10) Patent No.: US 12,309,328 B2
(45) Date of Patent: May 20, 2025

(54) DYNAMIC UPLOAD AND AUTOMATED WORKFLOWS FOR HOSTED IMAGES AND VIDEOS

(71) Applicant: AWES.ME, INC., Mountain View, CA (US)

(72) Inventors: Erik John Giberti, Rochester, MN (US); Alastair Morrison Jolly, Mountain View, CA (US)

(73) Assignee: AWES.ME, INC., Mountain View, CA (US)

( * ) Notice: Subject to any disclaimer, the term of this patent is extended or adjusted under 35 U.S.C. 154(b) by 0 days.

(21) Appl. No.: 18/595,209

(22) Filed: Mar. 4, 2024

(65) Prior Publication Data

US 2024/0305722 A1    Sep. 12, 2024

Related U.S. Application Data

(60) Provisional application No. 63/450,086, filed on Mar. 6, 2023.

(51) Int. Cl.
| | |
|---|---|
| *G06K 15/00* | (2006.01) |
| *G06F 16/955* | (2019.01) |
| *H04N 1/00* | (2006.01) |

(52) U.S. Cl.
CPC ....... *H04N 1/00172* (2013.01); *G06F 16/955* (2019.01); *H04N 1/00137* (2013.01); *H04N 1/00159* (2013.01); *H04N 1/00164* (2013.01)

(58) Field of Classification Search
CPC ........... H04N 1/00172; H04N 1/00137; H04N 1/00159; H04N 1/00164; G06F 16/955

USPC ......................................................... 358/1.15
See application file for complete search history.

(56) References Cited

U.S. PATENT DOCUMENTS

| | | | |
|---|---|---|---|
| 10,440,169 B1 * | 10/2019 | Gordon | G06F 3/04886 |
| 2002/0054765 A1 * | 5/2002 | Garfinkle | H04N 1/00137 |
| | | | 396/429 |
| 2003/0236831 A1 * | 12/2003 | Ortiz | H04N 1/2183 |
| | | | 709/204 |
| 2007/0103723 A1 * | 5/2007 | Wolcott | H04N 1/00148 |
| | | | 358/1.6 |
| 2010/0146073 A1 * | 6/2010 | Dittmar | H04L 67/52 |
| | | | 715/764 |

(Continued)

OTHER PUBLICATIONS

IP.com search History (Year: 2025).*
ProQuest search History (Year: 2025).*

*Primary Examiner* — Moustapha Diaby
(74) *Attorney, Agent, or Firm* — Polsinelli LLP

(57) ABSTRACT

A system and method for providing automated workflows for dynamically uploaded images and videos hosted at a hosting service is provided. At least one set of object data may be associated with a live-streaming media. One or more media files and a camera identifier associated with a camera may be received from the camera. The one or more media files may be auto-uploaded from the camera. A configuration to link the camera identifier associated with the camera and a gallery of an associated account may be received. The gallery may be associated with a webpage. The one or more media files may be auto-processed based on one or more automated workflows associated with the gallery. One of the automated workflows may be adding the one or more media files to the gallery of the associated account.

20 Claims, 3 Drawing Sheets

(56) References Cited

U.S. PATENT DOCUMENTS

2017/0083534 A1\* 3/2017 Strong ................. H04L 63/168
2018/0032997 A1\* 2/2018 Gordon ............. G06Q 30/0269

\* cited by examiner

DYNAMIC UPLOAD AND AUTOMATED WORKFLOWS FOR HOSTED IMAGES AND VIDEOS

CROSS-REFERENCE TO RELATED APPLICATIONS

This application claims priority from U.S. provisional application No. 63/450,086 filed Mar. 6, 2023, the disclosure of which is incorporated herein by reference.

BACKGROUND OF THE INVENTION

1. Field of the Invention

The present technology pertains to hosting images and videos that have been dynamically uploaded. More specifically, the present technology may provide for providing automated workflows for the hosted images and videos that have been dynamically uploaded.

2. Description of the Related Art

The production and availability of online information and media has gained prevalence in modern-day society. Thus, online presences—online content on webpages or web applications—have become therefore essential to professional participation and success by businesses and individuals. Examples of such online content may include profile pages on social network websites, blog web pages, online photo galleries, and the like.

Conversely, online users and audiences have become accustomed to having the ability to instantly access online information, experiences, news, photos, and videos over the internet. Mobile devices have further revolutionized the way people connect, learn, and consume information by providing access to online content from nearly any location in the world. While users may have become accustomed to being able to receive media content from online sources instantly, however, there remain a variety of content that may require file transfers, editing, processing, post-processing, other modifications, and steps, etc.

While various photo-sharing application exist, professional photographers often further undertake much more complex and sophisticated processes to edit, retouch, and otherwise transform their raw work product into their final form. Such processes may require manual inputs and actions, however, thereby becoming more time-intensive and less likely to meet the expectations of modern-day audiences.

There are presently no simple and efficient manner to instantly (e.g., in real-time) create and share online galleries with targeted audiences. As such, a problem exists with allowing the user to quickly access the desired files while providing accounts associated with photographers the tools they need for post-processing.

As the foregoing illustrates, there is a need for improved techniques for generating and delivering access to an online gallery with associated capabilities of receiving dynamic uploading of images and videos. More specifically, what is needed in the art is image and video hosting service that provides dynamic uploading along with automated workflows for the hosted images and videos that have been dynamically uploaded.

SUMMARY OF THE CLAIMED INVENTION

Disclosed are systems, apparatuses, methods, computer readable medium, and circuits for providing automated workflows for dynamically uploaded images and videos hosted at a hosting service. According to at least one example, a method includes receiving one or more media files and a camera identifier associated with a camera, wherein the one or more media files are automatically uploaded over a communication network by the camera during a photographic session. In some cases, the method includes identifying that the camera identifier of the camera is associated with an online gallery of a plurality of online galleries, the online gallery identified as having a web address. In some cases, the method includes applying one or more automated workflows to at least one subset of the received media files, wherein the at least one subset of media files is modified in accordance with the automated workflows. In some cases, the method includes populating the online gallery in real-time as the one or more modified subset media files are received over the communication network, wherein the online gallery is populated with the modified subset of media files.

In some cases, the method includes generating a link based on the web address of the online gallery, the link executable by a computing device to resolve the web address and access the online gallery based on the web address, and generating a display of the online gallery when the link is executed by the computing device, wherein the generated display includes the modified subset of media files. In some cases, the method includes applying a trained machine-learning model that is trained to manipulate media files in a similar style or preference as historical media files associated with the camera.

In some cases, the method includes training a machine-learning algorithm to result in the trained machine-learning model, wherein the machine-learning algorithm is trained based on training data including historical manipulations to the modified subset media files associated with the camera, and wherein the trained machine-learning model determines weights based on the training data. In some cases, the method includes linking the camera identifier with a subfolder the online gallery, wherein uploads from the respective camera is automatically uploaded into the subfolder. In some cases, the one or more of the automated workflows are user-specific or gallery-specific. In some cases, the method includes based on the received media files or the one or more modified subset media files, the online gallery may provide relevant data points or offers for further processing In another example, a system for providing automated workflows for dynamically uploaded images and videos hosted at a hosting service is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the system to receive one or more media files and a camera identifier associated with a camera, identify that the camera identifier of the camera is associated with an online gallery identified as having a web address, apply one or more of the automated workflows to at least one subset of the received media files, wherein the at least one subset of media files is modified in accordance with the automated workflows, and populate the online gallery in real-time as the one or more modified subset media files are received over a communication network, wherein the online gallery is populated with the modified subset of media files.

In some cases, the instructions cause the system to determine a location of the one or more media files by receiving webhooks including a plurality of unique identifiers, and query, by a web hosting server, an application programming interface for details pertaining to the plurality of unique identifiers including folder structure for the one or more media files and associated dates.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Aspects of the present disclosure include systems and methods for providing automated workflows for dynamically uploaded images and videos hosted at a hosting service. One or more media files and a camera identifier associated with a camera may be received from the camera. The one or more media files may be auto-uploaded from the camera. A configuration to link the camera identifier associated with the camera and a gallery of an associated account may be received. The gallery may be associated with a webpage. The one or more media files may be auto-processed based on one or more automated workflows associated with the gallery. One of the automated workflows may be adding the one or more media files to the gallery of the associated account. A link, such as a QR code, for the webpage may be generated in response to a request from a user device. The webpage may be displayed at the user device and the one or more media files may have been proceeded by the one or more automated workflows.

Figure 1:
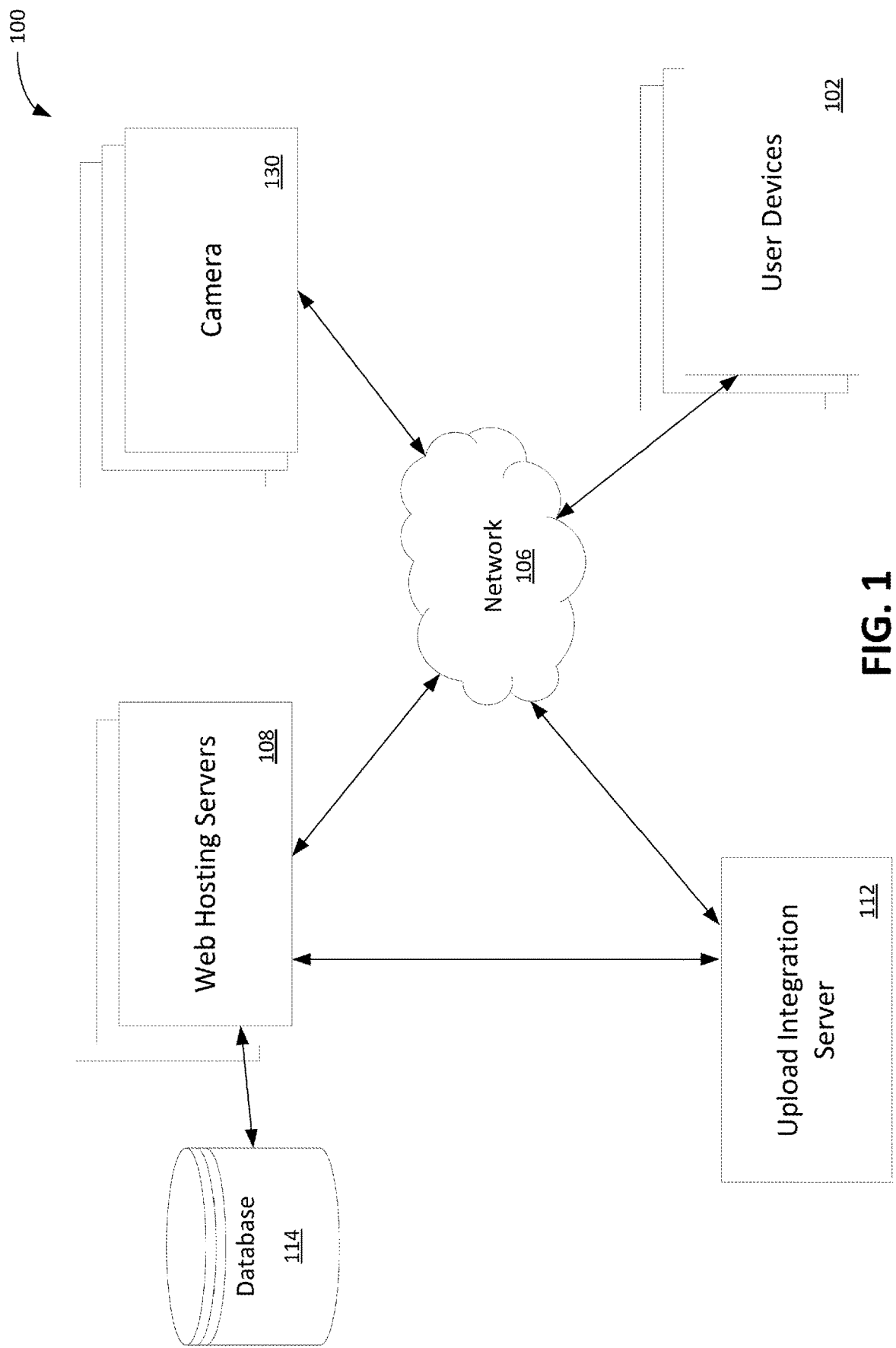
FIG. 1 illustrates an example network environment in which a system provides automated workflows for dynamically uploaded images and videos hosted at a hosting service.

FIG. 1 illustrates a computing system 100 configured for providing an automated upload and workflow service in which embodiments of the disclosure may be practiced. As shown, the computing system 100 may include a plurality of web hosting servers 108, an upload integration server 112, and a plurality of user devices (i.e., mobile/wireless devices) 102, each connected to a communications network 106 (for example, the Internet). The web hosting servers 108 may communicate with a database 114 via a local connection (for example, a Storage Area Network (SAN) or Network Attached Storage (NAS)) or over the Internet (for example, a cloud based storage service). A web hosting service may provide the web hosting servers 108, which may be configured to either directly access data included in the database 114 or to interface with a database manager that is configured to manage data included within the database 114. The web hosting service may also provide the upload integration server 112. The database 114 may include data objects that store data associated with user accounts, camera identifiers, billing information, media files, identifiers associated with the media files, workflow configurations associated with the user accounts, etc.

Each user device 102 may include conventional components of a computing device, for example, a processor, system memory, a hard disk drive, a battery, input devices such as a mouse and a keyboard, and/or output devices such as a monitor or graphical user interface, and/or a combination input/output device such as a touchscreen which not only receives input but also displays output. Each web hosting server 108 and the upload integration server 112 may include a processor and a system memory (not shown), and may be configured to manage content stored in database 114 using, for example, relational database software and/or a file system. The web hosting servers 108 may be programmed to communicate with one another, user devices 102, and the upload integration server 112 using a network protocol such as, for example, the TCP/IP protocol. The upload integration server 112 may communicate directly with the user devices 102 through the communications network 106. The user devices 102 are programmed to execute software, such as web browser programs and other software applications, and access web pages and/or applications managed by web hosting servers 108 by specifying a uniform resource locator (URL) that directs to web hosting servers 108.

In the embodiments described below, users are respectively operating the user devices 102 that are connected to the web hosting servers 108 over the communications network 106. Web pages are displayed to a user via the user device 102. The web pages are transmitted from the web hosting servers 108 to the user device 102 and processed by the web browser program stored in the user device 102 for display through a display device and/or a graphical user interface in communication with the user device 102.

In one example, images or videos displayed on the user device 102 may be a digital photograph or video accessed via an online photo gallery. The user device 102 may access the online photo gallery via the communications network 106 which, in turn, retrieves the online photo gallery from the web hosting servers 108 connected to the database 114 and causes the images to be displayed through a graphical user interface of the user device 102. The online photo gallery may be managed with a username and password combination, or other similar restricted access/verification required access methods, which allow the user to "log in" and access the images.

It is noted that the user device 102 may be a personal computer, laptop mobile computing device, smart phone, video game console, home digital media player, network-connected television, set top box, and/or other computing devices having components suitable for communicating with the communications network 106. The user device 102 may also execute other software applications configured to receive, display, modify, store, and upload media files and other data from the multi-device integration application, such as, but not limited to, text notifications, SMS data, email platforms and other application platforms.

The upload integration server 112 may further send webhooks including a plurality of unique identifiers in an assigned envelop to the web hosting servers 108. The web hosting servers 108 may query an application programming interface (API) for details pertaining to the plurality of unique identifiers, such as a location, such as a URL, for where one or more media files are located, and a folder structure for the media files including a date associated with each media file and associated user account. The web hosting servers 108 may then create a gallery and/or folder based on the provided folder structure and/or gallery for the associated user account. In some cases, the media files are stored locally to the web hosting servers 108 or on a cloud database and the respective one or more media files are then uploaded to the web hosting servers 108. In other cases, the media files are uploaded directly from the camera 130 via the upload integration server 112 to the web hosting servers 108. Uploading from the camera 130 may be via various transfer methods, including HTTP, FTP, WebDAV, etc.

The web hosting servers 108 may further provide generate a link, such as encoded in a QR code, a weblink (URL), a Bluetooth link, a near-field communications (NFC) link, etc. to the webpage, for users to view the gallery. Users that view the gallery do not need a user account associated with web hosting service. As an example, the user account may be associated with a professional photographer that takes photos for their clients. The client gets the link and can quickly view the gallery of the media files that the photographer has just taken. Further, each media file may be linked to various automated workflows, including a check-out workflow that provides the clients with a quick way to purchase media files soon after they are taken. The check-out workflow may be linked to online payment options, such as Apple Pay or Google Pay. Other automated workflows may include plug-ins with third-party editing services, such as Lightroom and artificial intelligence (AI)/machine learning (ML) imaging models that can edit the media files in AI-based protocols. For example, a learning model may be generated for the photographer based on a continually growing body of data regarding photos taken, filtered, retouched, and otherwise manipulated by the photographer. The learning model may discern patterns of actions associated with the photographer's style, taste, or preferences. Such model may be used to make predictions and recommendations as to how to which automatic workflow to apply to given photo. The learning model may further be used to customize the automatic workflow itself to the photographer's individual needs, style, or preferences.

In some case, a machine-learning algorithm may be trained to result in a trained machine-learning model. The machine-learning algorithm may be trained based on training data including historical manipulations to the processed media files associated with the camera. The trained machine-learning model may further determine weights based on the training data.

In addition, the web hosting servers 108 may further provide an API that third-party applications can provide their software services to be used on the media files in the gallery. The media files in the gallery may also be used through the API by third-party applications to generate other data points or product offerings for the photographer. For example, third-party AI editing software may determine through the API that a subset of the gallery needs to be edits and may provide those edits and then upload the edited media files back into the gallery. Other provided solutions may include, automatically culling, deleting blurry or accidental photos, etc.

In some cases, the editing may be performed manually by the photographer. In that case, optionally, the photographer may choose to select a proof delay option that sets a designated period of time before the media files are released to the user account, giving the photographer a grace period to manually edit the media files. The editing history and associated metadata may be stored as the media files are manually edited.

Each user account may be associated with a plurality of cameras and when uploading, more than one camera may upload to a same folder. Each folder may be associated with a day or a specific event, and different cameras may upload therein. One of the automated workflows may include adding the respective media files to their respective galleries based on the configuration that links the camera identifier associated with the camera with the gallery associated with the associated user account.

The web hosting servers 108 may provide the original media file alongside any manipulated or edited versions of the media file and may be stored in relation to one another. In other words, raw and rendered and sidecar files may all stored as part of a whole asset.

Figure 2:
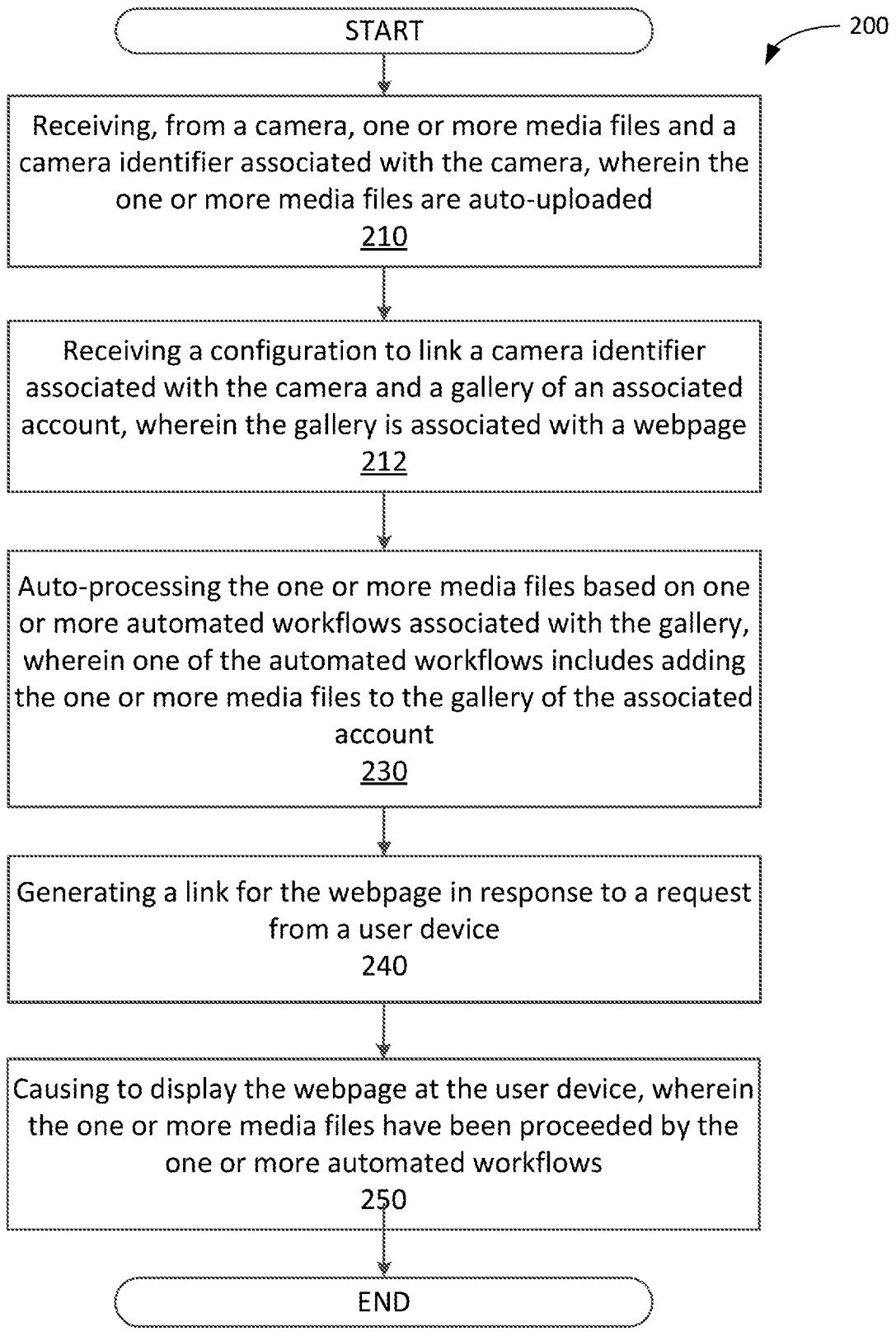
FIG. 2 is a flowchart illustrating an example method for providing automated workflows for dynamically uploaded images and videos hosted at a hosting service.
Figure 3:
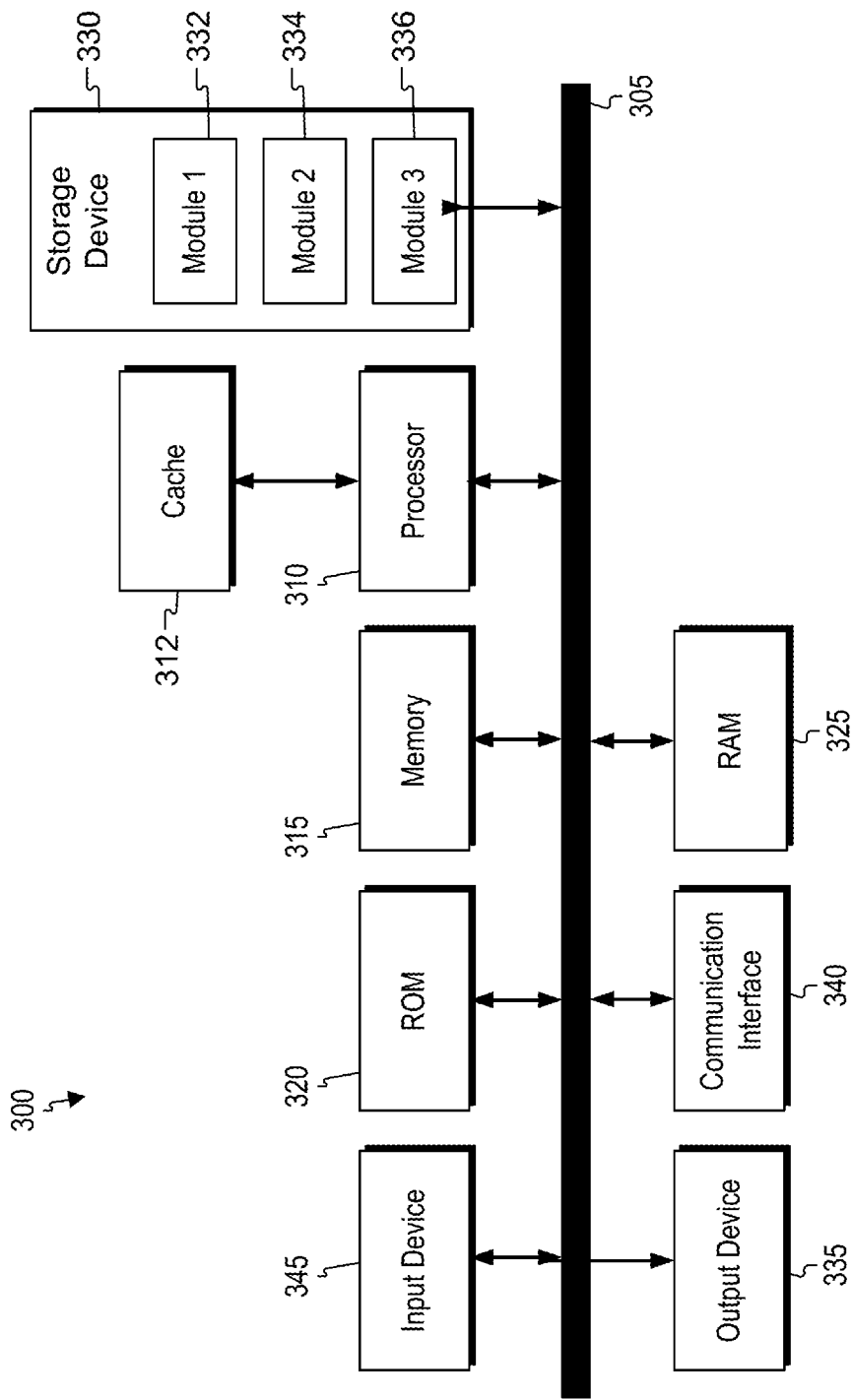
FIG. 3 shows an example system for implementing certain aspects of the present technology.

FIG. 2 is a flowchart illustrating an example method 200 for providing automated workflows for dynamically uploaded images and videos hosted at a hosting service. The method 200 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are examples and may include various alternatives, equivalents, or derivations thereof including but not limited to the order of execution of the same.

In step 210, one or more media files and a camera identifier associated with a camera may be received from the camera. The camera identifier associated with the camera may be configured to be associated to an associated account. The one or more media files may be auto-uploaded and may first be auto-uploaded to another database, where it is first stored, before they are uploaded to a gallery.

In step 220, a configuration to link the camera identifier associated with the camera and the gallery of the associated account may be received. The gallery may be associated with a webpage. Linking of the gallery indicates that any media files that are captured by the camera while there is a link, is uploaded to the specific gallery associated with the account.

For example, a photographer may be associated with a first camera and a second camera. However, these cameras, if not linked to a gallery, are not configured to upload the photos therein. The photographer may link a gallery named "Wedding 3-20-23" for the first camera and the second camera, and with the link, any media files taken by the first camera and the second camera is uploaded to the gallery named "Wedding 3-20-23", until the link the removed.

In step 230, the one or more media files may be auto-processed based on one or more automated workflows associated with the gallery. One such automated workflow may be adding the one or more media files to the gallery. Adding the one or more media files protocol may include determining where the one or more media files are stored, whether locally or from a cloud database. Alternatively, the one or more media files may be uploaded straight from the camera. If a determination of the location of the media files is necessary, webhooks including a plurality of unique identifiers may be received and the web hosting servers may query an API for details pertaining to the plurality of unique identifiers, such as a location, such as a URL, for where one or more media files are located, and a folder structure for the media files including a date associated with each media file and associated user account. Alternatively, the locations may be stored locally and accessed to determine the same types of data, such as folder structure.

Other types of automated workflows may be configured either by default or by the user account, and the configurations may be user-specific or gallery-specific. Users may choose which automated workflows they would like to be performed on the gallery, either before the media files are uploaded or after.

Other automated workflows may include plug-ins with third-party editing services, such as Lightroom and AI/ML imaging models that can edit the media files in pre-determined or AI-based protocols. In addition, the web hosting servers 108 may further provide an API that third-party applications can provide their software services to be used on the media files in the gallery. The media files in the gallery may also be used through the API by third-party applications to generate other data points or product offerings for the photographer. For example, third-party AI editing software may determine through the API that a subset of the gallery needs to be edits and may provide those edits and then upload the edited media files back into the gallery. Other provided solutions may include, automatically culling, deleting blurry or accidental photos, etc.

From the user device perspective, a link, such as a QR code, may be used to view the gallery. Links, such as QR codes, may be generated upon request. The user device showing the gallery may provide options for the users to either purchase, request other types of workflows, such as additional editing, and/or provide comments about specific media files. As such, each media file may be linked to various automated workflows, including a check-out workflow that provides the clients with a quick way to purchase media files soon after they are taken. The check-out workflow may be linked to online payment options.

Systems and methods for providing automated workflows for dynamically uploaded images and videos hosted at a hosting service are provided herewith. One or more media files and a camera identifier associated with a camera may be received from the camera. The one or more media files may be auto-uploaded from the camera. A configuration to link the camera identifier associated with the camera and a gallery of an associated account may be received. The gallery may be associated with a webpage. The one or more media files may be auto-processed based on one or more automated workflows associated with the gallery. One of the automated workflows may be adding the one or more media files to the gallery of the associated account. A link, such as a QR code, for the webpage may be generated in response to a request from a user device. The webpage may be displayed at the user device and the one or more media files may have been proceeded by the one or more automated workflows.

FIG. 3 shows an example system for implementing certain aspects of the present technology, which can be for example any computing device making up a user device 102 or the web server or other web hosting service, or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments, computing system 300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read-only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement, and therefore the basic features here may easily be substituted for improved hardware or firmware arrangements as they are developed.

Storage device 330 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method of providing automated workflows for dynamically uploaded images and videos hosted at a hosting service, the method comprising:
receiving one or more media files and a camera identifier associated with a camera, wherein the one or more media files are automatically uploaded over a communication network by the camera during a photographic session;
identifying that the camera identifier of the camera is associated with an online gallery of a plurality of online galleries, the online gallery identified as having a web address and associated with a user account of a plurality of user accounts;
applying one or more automated workflows associated with the user account to at least one subset of the received media files, wherein the at least one subset of media files is modified in accordance with the automated workflows; and
populating the online gallery in real-time as the one or more modified subset media files are received over the communication network, wherein the online gallery is populated with the modified subset of media files.

2. The method of claim 1, further comprising:
generating a link based on the web address of the online gallery, the link executable by a computing device to resolve the web address and access the online gallery based on the web address; and
generating a display of the online gallery when the link is executed by the computing device, wherein the generated display includes the modified subset of media files.

3. The method of claim 1, further comprising applying a trained machine-learning model that is trained to manipulate media files in a similar style or preference as historical media files associated with the camera.

4. The method of claim 3, further comprising training a machine-learning algorithm to result in the trained machine-learning model, wherein the machine-learning algorithm is trained based on training data including historical manipulations to the modified subset media files associated with the camera, and wherein the trained machine-learning model determines weights based on the training data.

5. The method of claim 1, further comprising linking the camera identifier with a subfolder of the online gallery, wherein uploads from the respective camera is automatically uploaded into the subfolder.

6. The method of claim 1, wherein the one or more of the automated workflows are specific to the user account or specific to the online gallery associated with the user account.

7. The method of claim 1, further comprising providing relevant data points or offers from the online gallery for further processing based on the received media files or the one or more modified subset media files.

8. A system for providing automated workflows for dynamically uploaded images and videos hosted at a hosting service, the system comprising:
memory that stores automated workflows; and
a processor that executes instructions stored in memory, wherein the processor executes the instructions to perform a method comprising:
receiving one or more media files and a camera identifier associated with a camera;
identifying that the camera identifier of the camera is associated with an online gallery identified as having a web address and associated with a user account of a plurality of user accounts;
applying one or more of the automated workflows associated with the user account to at least one subset of the received media files, wherein the at least one subset of media files is modified in accordance with the automated workflows; and
populating the online gallery in real-time as the one or more modified subset media files are received over a communication network, wherein the online gallery is populated with the modified subset of media files.

9. The system of claim 8, wherein the method further comprising:
determining a location of the one or more media files by receiving webhooks including a plurality of unique identifiers; and
querying, by a web hosting server, an application programming interface for details pertaining to the plurality of unique identifiers including folder structure for the one or more media files and associated dates.

10. The system of claim 8, wherein the one or more of the automated workflows are specific to the user account or specific to the online gallery associated with the user account.

11. The system of claim 8, wherein the processor execute further instructions to:
    generate a link based on the web address of the online gallery, the link executable by a computing device to resolve the web address and access the online gallery based on the web address; and
    generate a display of the online gallery when the link is executed by the computing device, wherein the generated display includes the modified subset of media files.

12. The system of claim 8, wherein the processor execute further instructions to apply a trained machine-learning model that is trained to manipulate media files in a similar style or preference as historical media files associated with the camera.

13. The system of claim 12, wherein the processor execute further instructions to train a machine-learning algorithm to result in the trained machine-learning model, wherein the machine-learning algorithm is trained based on training data including historical manipulations to the modified subset media files associated with the camera, and wherein the trained machine-learning model determines weights based on the training data.

14. The system of claim 12, wherein the processor execute further instructions to link the camera identifier with a subfolder of the online gallery, wherein uploads from the respective camera is automatically uploaded into the subfolder.

15. The system of claim 12, wherein the processor execute further instructions to provide relevant data points or offers from the online gallery for further processing based on the received media files or the one or more modified subset media files.

16. A non-transitory computer-readable storage medium that includes a program executable by a processor to perform a method for automated workflows for dynamically uploaded images and videos hosted at a hosting service, the method comprising:
    receiving one or more media files and a camera identifier associated with a camera, wherein the one or more media files are automatically uploaded over a communication network by the camera during a photographic session;
    identifying that the camera identifier of the camera is associated with an online gallery of a plurality of online galleries, the online gallery identified as having a web address and associated with a user account of a plurality of user accounts;
    applying one or more automated workflows associated with the user account to at least one subset of the received media files, wherein the at least one subset of media files is modified in accordance with the automated workflows; and
    populating the online gallery in real-time as the one or more modified subset media files are received over the communication network, wherein the online gallery is populated with the modified subset of media files.

17. The non-transitory computer-readable storage medium of claim 16, further comprising instructions executable to apply a trained machine-learning model that is trained to manipulate media files in a similar style or preference as historical media files associated with the camera.

18. The non-transitory computer-readable storage medium of claim 17, further comprising instructions executable to train a machine-learning algorithm to result in the trained machine-learning model, wherein the machine-learning algorithm is trained based on training data including historical manipulations to the modified subset media files associated with the camera, and wherein the trained machine-learning model determines weights based on the training data.

19. The non-transitory computer-readable storage medium of claim 16, further comprising instructions executable to link the camera identifier with a subfolder of the online gallery, wherein uploads from the respective camera is automatically uploaded into the subfolder.

20. The non-transitory computer-readable storage medium of claim 16, further comprising instructions executable to provide relevant data points or offers from the online gallery for further processing based on the received media files or the one or more modified subset media files.

* * * * *